3,022,133
METHODS OF INHIBITING THE PITTING OF IRON AND STEEL
George B. Hatch, Hampton Township, Allegheny County, Pa., assignor to Hagan Chemicals & Controls, Inc., a corporation of Pennsylvania
No Drawing. Filed Apr. 23, 1959, Ser. No. 808,320
6 Claims. (Cl. 21—2.7)

This invention relates to methods of inhibiting the pitting of iron and steel and particularly relates to a method of inhibiting pitting by the use of low concentrations of chromates and dichromates in aqueous solution by the addition of certain synergistic agents which cooperate with the chromate and dichromate.

Chromates and dichromates have long been used to inhibit corrosion on iron and steel in contact with aqueous systems. The concentration of chromate and dichromate necessary to effect such corrosion inhibition has been in the range of 1,000 to 5,000 parts per million in the system. Such concentrations will provide substantially complete protection against corrosive attack. However, there are many disadvantages to this practice. In the first place, the use of high concentrations of chromate and dichromate is expensive. Secondly, there is a tendency for systems containing these high concentrations of chromate and dichromate to build up objectionable deposits wherever water from the system escapes into the atmosphere and is evaporated as for example, where water is splashed or sprayed out of a cooling tower onto the roof or supporting structure. Thirdly, chromates and dichromates in high concentrations are somewhat toxic and the danger increases as the concentration increases. High concentrations of chromates and dichromates cause serious disposal problems and serious problems of loss where blowdown is practiced as in the case of recirculating cooling systems and the like.

Concentrations of chromates and dichromates less than 12 parts per million have some effectiveness for preventing corrosion over limited areas of iron and steel surfaces with which they come into contact. However, these low concentrations of chromate and dichromate are much less effective than higher amounts and are not effective over the entire area and unusually heavy localized pitting in the unprotected area or areas will occur. As a result of this localized pitting, low concentrations of chromate and dichromate have not been used and cannot be used under ordinary conditions to inhibit corrosive attack of aqueous systems.

I have discovered that the addition of zinc ions, preferably, in an amount between 2 parts per million to about 10 parts per million to the solution containing such low concentrations of chromate and dichromate as would normally cause localized pitting will inhibit the localized pitting action of the chromates and dichromates upon iron and steel and will provide corrosion inhibition over the entire surface area. The use of larger amounts of zinc than 10 parts per million will produce a similar effect but are not economical. The presence of the zinc ions appears to have a synergistic action with the chromates and dichromates, whereby the combination inhibits both corrosion and pitting so as to produce an effect which is economically equal to or better than the effect of the presence of chromate and dichromate in the range of 1,000 to 5,000 parts per million. In short, the addition of 2 to 10 parts zinc ions makes it possible to do with 10 to 12 parts per million of chromate, a corrosive inhibiting operation which is economically more feasible than that which can be produced by using 1,000 to 5,000 parts per million of chromate as has been the prior practice.

I have found that in the presence of amounts of chromate and dichromate in excess of 12 parts per million this synergistic effect begins to disappear and at 25 parts per million of dichromate, for example, even in the presence of zinc, a marked amount of pitting continues to exist.

The following tables will illustrate the effect of this treatment.

The first table shows the average weight loss of a steel surface in milligrams per square decimeter per day over a five day period:

Table I

| Zn++ in parts/million | Na$_2$Cr$_2$O$_7$ in parts per million | | | | | |
|---|---|---|---|---|---|---|
| | 0 | 2 | 5 | 10 | 25 | 50 |
| 0 | 189 | | 42.8 | 26.9 | 22.1 | 13.0 |
| 2 | 113 | 15.7 | 4.4 | 3.3 | 5.2 | 8.0 |
| 5 | 112 | 6.2 | 2.3 | 2.8 | 3.6 | 5.2 |
| 10 | 206 | 5.5 | 2.6 | 2.8 | 4.6 | 5.4 |
| 25 | 59 | 3.7 | 2.8 | 2.2 | 3.7 | 5.5 |
| 50 | 38.7 | 4.2 | 3.1 | 2.6 | 2.8 | 2.8 |

The second table shows the average depth of the 5 deepest pits, at the end of five days, expressed in mils (thousandths of an inch):

Table II

| Zn++ in parts/million | Na$_2$Cr$_2$O$_7$ in parts per million | | | | | |
|---|---|---|---|---|---|---|
| | 0 | 2 | 5 | 10 | 25 | 50 |
| 0 | 0 | | 3.4 | 1.5 | 2.5 | 3.3 |
| 2 | 0 | 1.6 | 0.6 | 0.4 | 2.2 | 3.4 |
| 5 | 0 | 0.8 | 0.6 | 0.2 | 1.2 | 1.7 |
| 10 | 0 | .7 | 0.6 | 0.3 | 1.5 | 1.9 |
| 25 | 1.4 | 0 | 0 | 0.3 | 1.2 | 1.9 |
| 50 | 0 | .4 | 0.3 | 0 | 1.1 | 1.5 |

The third table shows the depth of the deepest pits after five days, expressed in mils:

Table III

| Zn++ in parts/million | Na$_2$Cr$_2$O$_7$ in parts per million | | | | | |
|---|---|---|---|---|---|---|
| | 0 | 2 | 5 | 10 | 25 | 50 |
| 0 | 0 | | 3.6 | 2.5 | 3.5 | 4.0 |
| 2 | 0 | 1.9 | 1.3 | 0.9 | 3.3 | 4.7 |
| 5 | 0 | 1.2 | 0.9 | 0.2 | 2.0 | 2.8 |
| 10 | 0 | 0.9 | 1.2 | 0.5 | 3.0 | 2.2 |
| 25 | 2.3 | 0 | 0 | 0.3 | 1.8 | 2.5 |
| 50 | 0 | 0.6 | 0.5 | 0 | 2.0 | 1.9 |

In the foregoing tables, zinc sulfate was used as the source of zinc ions. The protective effect of the zinc ion is apparent from the tables. Similar results may be obtained using zinc chloride, zinc nitrate, and similar zinc compounds capable of producing zinc ions under the conditions present.

It will also be seen from the foregoing tables that at 25 parts per million and 50 parts per million of Na$_2$Cr$_2$O$_7$ the weight loss of pit depth is materially larger than at 10 parts per million.

It was found that the inhibitive effect was best where the solution was slightly acidic (pH 5–7). The invention is effective at higher pH but there is a tendency toward precipitation of zinc compounds as the solution becomes more alkaline. The pH should accordingly be adjusted to prevent this precipitation.

While I have described a present preferred method of practicing the invention herein disclosed, it is to be distinctly understood that the invention is not limited thereto but may be otherwise variously practiced within the scope of the following claims.

I claim:
1. A method of inhibiting the pitting of iron and steel by chromates and dichromates in concentrations below about 25 parts per million in aqueous solutions comprising adding thereto at least 2 parts per million of zinc ion.

2. A method of inhibiting the pitting of iron and steel by chromates and dichromates in concentrations below about 25 parts per million in aqueous solutions comprising adding thereto a soluble zinc salt in amount sufficient to produce from about 2 parts per million of zinc ions to about 10 parts per million of zinc ions.

3. A method of inhibiting the pitting of iron and steel by low concentration of chromates and dichromates below about 25 parts per million in aqueous solutions comprising the steps of adjusting the pH of the solution to between about pH 5 and pH 7, and adding to the adjusted solution about 2 parts per million to about 10 parts per million of zinc ions in the form of a soluble salt of zinc.

4. A method of inhibiting corrosion and pitting of iron and steel in aqueous systems which comprises adding to the aqueous system a member from the group consisting of chromates and dichromates in an amount up to about 12 parts per million and a zinc compound capable of producing zinc ions under the conditions present in the system.

5. A method of inhibiting corrosion and pitting of iron and steel in aqueous systems which comprises adding to the aqueous system a member from the group consisting of chromates and dichromates in an amount up to about 12 parts per million and a zinc compound capable of producing from about 2 parts per million of zinc ions to about 10 parts per million of zinc ions under the conditions present in the system.

6. A method of inhibiting corrosion and pitting of iron and steel in aqueous systems which comprises adding to the aqueous system a member from the group consisting of water soluble chromates and dichromates in an amount up to about 12 parts per million, adjusting the pH of the solution between about pH 5 and pH 7, and adding to the adjusted system about 2 parts per million to about 10 parts per million of zinc ions in the form of a water soluble salt of zinc and a zinc compound capable of producing zinc ions under the conditions present in the system.

References Cited in the file of this patent
UNITED STATES PATENTS

| | | |
|---|---|---|
| 2,695,876 | Fariss | Nov. 30, 1954 |
| 2,900,222 | Kahler et al. | Aug. 18, 1959 |

UNITED STATES PATENT OFFICE
CERTIFICATE OF CORRECTION

Patent No. 3,022,133                        February 20, 1962

George B. Hatch

It is hereby certified that error appears in the above numbered patent requiring correction and that the said Letters Patent should read as corrected below.

Column 2, Table III, column 4, line 3 thereof, for "0 9" read -- 0.9 --.

Signed and sealed this 12th day of June 1962.

(SEAL)
Attest:

ERNEST W. SWIDER                                    DAVID L. LADD
Attesting Officer                                        Commissioner of Patents